March 1, 1966  
E. S. BROOKS  
3,238,067  
AUTOMATICALLY ACTIVATED BATTERY HAVING  
A REPLACEABLE TYPE GAS GENERATOR  
Filed Dec. 13, 1962
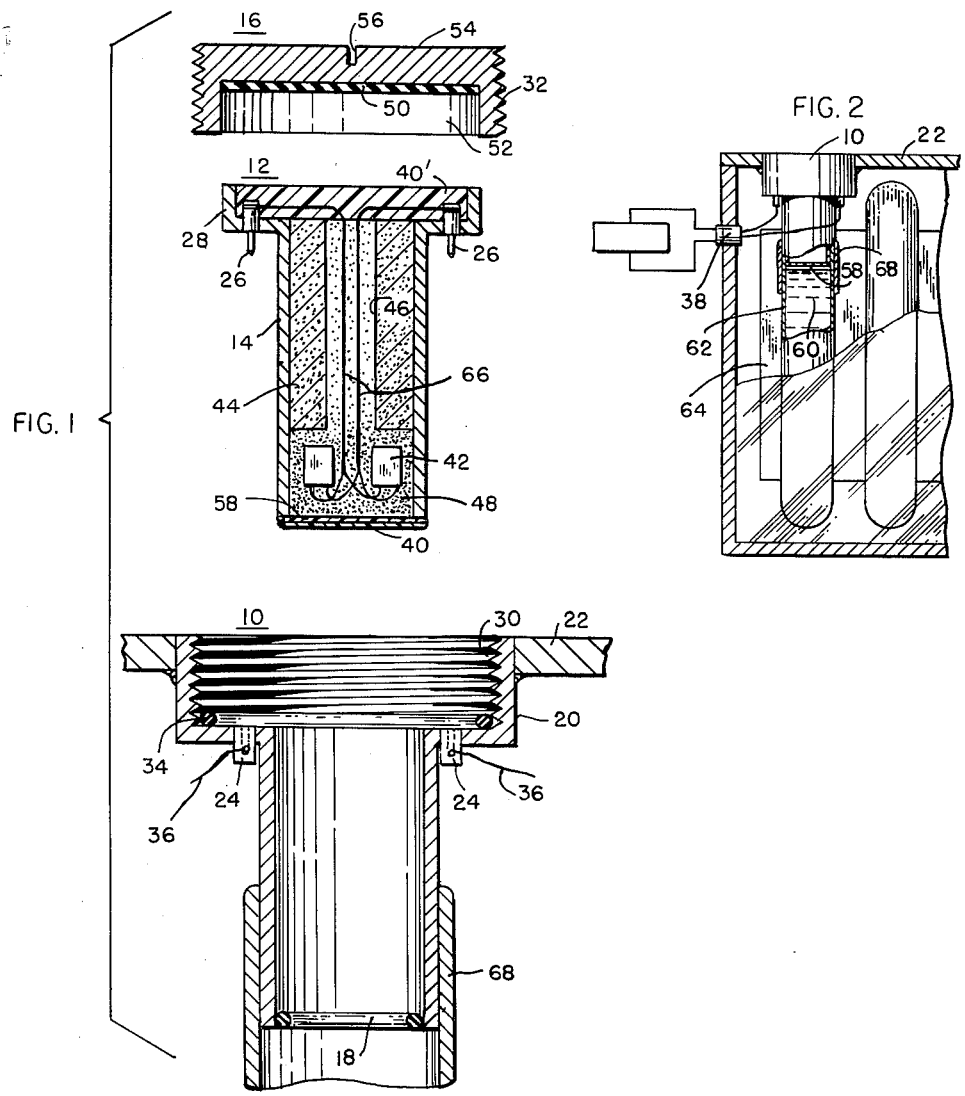
INVENTOR,  
EDWARD S. BROOKS  
BY Harry M. Saragovitz  
ATTORNEY.

United States Patent Office 3,238,067
Patented Mar. 1, 1966

3,238,067
AUTOMATICALLY ACTIVATED BATTERY HAVING A REPLACEABLE TYPE GAS GENERATOR
Edward S. Brooks, Oakhurst, N.J., assignor to the United States of America as represented by the Secretary of the Army
Filed Dec. 13, 1962, Ser. No. 244,530
2 Claims. (Cl. 136—90)
(Granted under Title 35, U.S. Code (1952), sec. 266)

The invention described herein may be manufactured and used by or for the Government for governmental purposes, without the payment of any royalty thereon.

This invention relates to replaceable type gas generators and particularly to a replaceable type gas generator for use in an automatically activated battery as hereinafter described.

Gas generators, often referred to as squibs, gas cartridges, or pressure cartridges, have become objects of increasing interest in the field of power sources. Their sole purpose in automatically activated batteries is to generate gas which in turn forces the stored electrolyte from the sealed container into the cell compartments. Electrical energy is supplied to ignite the gas generator. The resulting gas pressure ruptures diaphragms adjacent to the generator, and the transfer of this pressure by the electrolyte ruptures additional diaphragms located adjacent to a battery manifold adapter. The electrolyte is driven through a coiled metal tube reservoir by the gas into the cell compartment, all in less than one second. Such an automatic activation system is fully disclosed in U.S. Patent No. 3,022,364 to M. F. Chubb et al.

In the assembly of an automatic activation system as above described, the coiled metal tube reservoir and its appended or rigidly positioned gas generator is fitted snugly around the battery block of cell compartments, and the complete assembly then fitted into a metallic battery container. The assembly is then potted with an epoxy resin or with a foamed potting compound depending upon the weight limitations of the particular application. When the final assembly is complete, there are no moving or movable parts, and all components are electrically insulated.

One difficulty encountered with the above described system is that a malfunction of the gas generator due to excessive high temperature storage and/or excessive electrical test currents causes the entire battery to be discarded as it is difficult to replace the gas generator without destroying the battery once it has been potted. In terms of cost, this represents a serious disadvantage as the gas generator costs about one-thirtieth of the cost of the entire battery.

A principal object of this invention is to develop a replaceable gas generator for use in an automatically activated battery, and particularly for use in an automatically activated battery as above described and as exemplified by the automatically activated zinc-silver oxide battery. A further object is to develop a gas generator that can be readily removed from an automatically activated battery without disassembling the battery. A still further object of the invention is to develop a gas generator for use in an automatically activated battery wherein the gas generator has simple plug-in type terminals which require no soldering of terminals or lead wires.

It has now been found that the foregoing objectives can be obtained by a gas generator assembly as hereinafter described. The gas generator assembly consists of three principal members, to wit, a gas generator receptacle, a replaceable gas generator that fits into the gas generator receptacle, and removable means for maintaining the gas generator in the gas generator receptacle and also to permit free access to the gas generator when removal thereof is desired.

One embodiment of such a gas generator assembly is shown in the accompanying drawing in which:

FIG. 1 is an exploded view partially in cross-section of the gas generator assembly; and FIG. 2 is a partial view of a side elevation broken away showing the gas generator assembly in connection with the coiled metal tube reservoir of the automatically activated battery.

Referring to FIG. 1, there is shown a gas generator receptacle 10 adapted to receive a gas generator 12 encased in a metal container 14, and a retaining cap 16 adapted to fit over the top or exposed portion of gas generator 12. The gas generator receptacle 10 is terminated at one end by an annular rubber ring 18 that will support the container 14 of the gas generator 12 when positioned within container 14. The generator receptacle 10 connects with the coiled metal tube reservoir by means of a conventional coupling tubular member 68, which does not form part of this invention. The gas generator receptacle 10 is provided with an external tubular flange 20 affixed to the battery case 22. Extending through the base of the flange 20 and insulatably affixed thereto are a pair of electrical terminals 24 adapted to mate with electrical terminals 26 depending from the annular rim 28 which is affixed to the top of container 14. The inner surface 30 of the external tubular flange 20 is threaded to receive the threads 32 on the outer surface of the retaining cap 16. A rubber type gasket 34 is positioned on the base of the flange 20 to insure sealing against moisture or other contaminating materials.

Electrical terminals 24 are provided with external leads 36 which, in turn, connect with a plug 38 in the battery casing (FIG. 2).

The end portion of the container 14 of gas generator 12 supported by the rubber ring 18 is sealed with epoxy compound 40 and provided with an electrical igniting device or electrical match 42 composed of two resistance wires in parallel for reliability based on redundancy. Adjacent to the electrical match 42 is the gas generating material 44 in the form of a tubular grain provided with a core 46 to facilitate connection of the insulated wire 66 to the electrical match 42. Packed tightly around the electrical match 42 is the primer powder material 48. Some primer powder material is also placed in the core 46. The insulated wire 66 from the electrical match 42 connects with electric terminals 26 as shown.

A rubber wafer 50 is positioned in the hollowed out section 52 of retaining cap 16 to fit over gas generator annular rim 28 which is provided with an epoxy seal 40. The retaining cap 16 is also provided in its top surface 54 with a slot 56 which allows the cap to be removed by a screwdriver.

FIG. 2 is illustrative of how the gas generator assembly of FIG. 1 could be embodied in an automatically activated battery. Upon a signal from an external firing source connected to the plug 38, the electric match of the gas generator ignites the gas generating material 44 causing the gas formed to break the epoxy seal 40 and rupture the diaphragm generally represented as 58 forcing electrolyte 60 through the coiled tube reservoir 62 into the block of cell compartments represented as 64 in a manner as more fully described in U.S. Patent No. 3,022,364 to M. F. Chubb et al.

It is intended that the foregoing description be considered merely as illustrative and not in limitation of the invention as hereinafter described.

What is claimed is:

1. In an automatically activated battery comprising a cell compartment, an electrolyte reservoir within a coiled tube surrounding the cell compartment, gas generating means for pushing electrolyte normally stored in the coiled tube into the cell compartment, and an encasement for the cell compartment, coiled tube, and gas generator in the form of a potting compound and a battery case, the improvement in which said gas generator means comprises a replaceable gas generator assembly, said gas generator assembly comprising a gas generator receptacle provided with a pair of terminals, a gas generator positioned within said receptacle and including a pair of terminals mating with said gas generator receptacle terminals, removable means maintaining said gas generator in said gas generator receptacle, and electrical match means in said gas generator electrically connected with said generator receptacle terminals.

2. In an automatically activated battery according to claim 1 wherein the removable means for maintaining the gas generator in the gas generator receptacle is a threaded cap.

References Cited by the Examiner
UNITED STATES PATENTS

| | | | |
|---|---|---|---|
| 2,989,381 | 6/1961 | Musser | 23—281 |
| 3,022,364 | 2/1962 | Chubb et al. | 136—90 |

ALLEN B. CURTIS, *Primary Examiner.*

MURRAY TILLMAN, WINSTON A. DOUGLAS,
*Examiners.*

B. J. OHLENDORF, *Assistant Examiner.*